US012394318B2

(12) United States Patent
Ona Selfa et al.

(10) Patent No.: US 12,394,318 B2
(45) Date of Patent: Aug. 19, 2025

(54) AERODROME SIGNALLING SYSTEM WITH CELLULAR COMMUNICATION CAPABILITY

(71) Applicant: ADB SAFEGATE BV, Zaventem (BE)

(72) Inventors: Gregory Ona Selfa, Alsemberg (BE); Martin Le Roux, Huldenberg (BE); André Jelu, Hoegaarden (BE)

(73) Assignee: ADB Safegate BV, Zaventem (BE)

( * ) Notice: Subject to any disclaimer, the term of this patent is extended or adjusted under 35 U.S.C. 154(b) by 135 days.

(21) Appl. No.: 18/039,300

(22) PCT Filed: Dec. 16, 2021

(86) PCT No.: PCT/EP2021/086070
§ 371 (c)(1),
(2) Date: May 30, 2023

(87) PCT Pub. No.: WO2022/129271
PCT Pub. Date: Jun. 23, 2022

(65) Prior Publication Data
US 2024/0005800 A1    Jan. 4, 2024

(30) Foreign Application Priority Data

Dec. 16, 2020  (EP) ..................................... 20214755
Mar. 29, 2021  (EP) ..................................... 21165461

(51) Int. Cl.
*G08G 5/22*   (2025.01)
*B64F 1/18*   (2006.01)
*H04W 84/04*  (2009.01)

(52) U.S. Cl.
CPC ................. *G08G 5/22* (2025.01); *B64F 1/18* (2013.01); *H04W 84/042* (2013.01)

(58) Field of Classification Search
CPC ............ G08G 5/22; G08G 5/51; G08G 5/727; G08G 5/76; B64F 1/18; H04W 84/042;
(Continued)

(56) References Cited

U.S. PATENT DOCUMENTS 6,282,488 B1    8/2001  Castor
8,174,408 B2    5/2012  Johnston et al.
(Continued)

FOREIGN PATENT DOCUMENTS

CN    1012061760 B    4/2010
CN    205451341 U    8/2016
(Continued)

OTHER PUBLICATIONS

Federal Institute of Industrial Property, Search Report, Published Feb. 4, 2025, Russia.

*Primary Examiner* — Brandon D Lee
(74) *Attorney, Agent, or Firm* — Rankin, Hill & Clark, LLP (57) ABSTRACT

Aerodrome signalling system (100), comprising a plurality of signalling units (2), each comprising at least one aerodrome signalling device (9, 10), and a central communication unit (4) configured for data communication with the plurality of signalling units. The plurality of signalling units (2) each comprise a wireless data communication device (18) configured for cellular data communication and at least one sensor device (15) configured to capture measurement data in relation to one or more of: an environmental condition, a meteorological condition, a presence of an object, a movement of an object and a status condition relating to the respective signalling unit other than a status condition of the respective at least one signalling device. The at least one sensor device (15) is configured to communicate the mea-
(Continued)

surement data to the wireless data communication device for transmission via a cellular network.

20 Claims, 6 Drawing Sheets

(58) Field of Classification Search
CPC .. H04W 4/42; H04W 56/002; H04B 7/18502; H04L 67/12
See application file for complete search history.

(56) References Cited

U.S. PATENT DOCUMENTS

| | | |
|---|---|---|
| 8,284,751 B2 | 10/2012 | Kock |
| 2006/0202864 A1 | 9/2006 | Pirschel |
| 2009/0058681 A1 | 3/2009 | Johnston |
| 2015/0296600 A1* | 10/2015 | Gumaer ................ H05B 47/19 315/294 |

FOREIGN PATENT DOCUMENTS

| | | |
|---|---|---|
| DE | 19949737 A1 | 4/2001 |
| DE | 10104950 A1 | 10/2001 |
| EP | 1606785 A1 | 12/2005 |
| JP | 2016-10722 A | 6/2016 |
| NL | 2023611 B | 2/2021 |
| RU | 2475968 C | 2/2013 |

* cited by examiner

AERODROME SIGNALLING SYSTEM WITH CELLULAR COMMUNICATION CAPABILITY

TECHNICAL FIELD

The present invention is related to data communication means for signalling systems at an aerodrome. In particular, the present invention is related to digital transformation of aerodrome signalling and surveillance systems.

BACKGROUND ART

There are a large number of signalling devices at aerodromes, such as lighting devices, which may be located in particular on or in the vicinity of aprons, ramps, taxiways or runways, or else, for example, on buildings such as hangars, on the air traffic control (ATC) tower or on other facilities. Signalling devices may also include, for example, radar devices or radio beacons.

Aerodrome signalling systems having a control unit and a central communication unit able to communicate with a plurality of signalling devices are known from EP 1523864 and EP 1606785. The signalling devices are connected to the control unit and the central communication unit via a power supply line. Communication between the central communication unit and the signalling devices is performed via the power supply line through an orthogonal frequency-division multiplexing (OFDM) technique in which the data stream is split across a number of narrowband channels in a limited frequency range to reduce interference and crosstalk. The signalling devices comprise at their end an addressable communication gateway device able to communicate with the central communication unit. The data communication via the power supply line can include control commands for operating the signalling devices, and may include measurement data captured by sensors arranged in proximity of the signalling devices.

Along the power supply line galvanic insulating transformers are arranged at each node with a signalling device. The communication gateway devices ae arranged at the secondary side of the transformers, at the side of the signalling device. Since these transformers typically attenuate high frequency signals, dedicated transformers must be used allowing high frequency signals to pass through, increasing installation costs. Yet, the usable frequency bands are typically limited to about 190 kHz, limiting the data bandwidth.

Most aerodrome signalling devices, in particular aeronautic ground lighting (AGL), are arranged as series circuits. Such a topology further limits the amount of information that can be passed through the circuit for monitoring the operational conditions of the signalling system. The bandwidth does not allow to pass additional information obtained from various sensor or historical data stored at the device. Furthermore, for security reasons, status condition information is typically stored centrally within the signalling system, with limited accessibility by maintenance personnel.

SUMMARY

There is therefore a need in the art of providing a network of distributed sensors on an aerodrome in an economic way for increasing safety. There is a need in the art of providing an aerodrome signalling system allowing a higher amount of information to be communicated and gathered for improved control and maintenance of the system. There is also a need in the art of providing aerodrome signalling systems allowing easier and faster maintenance and monitoring.

According to a first aspect, there is therefore provided an aerodrome signalling system, as set out in the present disclosure and in the appended claims. An aerodrome signalling system as described herein comprises a plurality of signalling units, each comprising at least one aerodrome signalling device, and a central communication unit configured for data communication with the plurality of signalling units. The plurality of signalling units and possibly the central communication unit comprise a wireless data communication device configured for cellular communication of measurement data in relation to one or more of: an environmental condition, a meteorological condition, a presence of a (foreign) object, a movement of a (foreign) object and a status condition relating to the respective signalling unit other than a status condition of the respective at least one signalling device, and possibly further data representing a condition of the aerodrome signalling system/the at least one aerodrome signalling device, or of control signals for operating the aerodrome signalling system. The measurement data is captured by one or more sensor devices incorporated in the signalling units. The wireless data communication device can communicate or co-operate with a communication device for data communication via a power supply line through which the at least one aerodrome signalling device is supplied with electric power.

According to the present disclosure hence a network of distributed sensors over the airfield can be obtained by incorporating sensor devices in the signalling units. The sensor devices communicate with wireless communication devices provided in the light units configured to transmit data gathered by the distributed sensors over a cellular network. The present disclosure hence makes it possible to create distributed sensor networks for sensing various conditions, either outside or inside the enclosure of the signalling unit. These conditions are advantageously not related to an operating condition of the signalling device itself. Rather, the measurement data obtained from these sensor devices serves the purpose of improving air traffic control and airfield security and safety by providing a distributed system of sensors which are arranged at positions that are relevant for the airfield traffic and that gather a vast amount of data in a non-cooperative manner: meteorological conditions, which may vary from spot to spot on the airfield, environmental conditions, safety conditions of the signalling unit enclosure (water ingress, broken window, excessive vibration, etc.), and non-cooperative detection of airfield traffic enhancing existing traffic control systems. The cellular communication capability makes it possible to simultaneously transmit a vast amount of data captured by various sensor devices on the airfield.

According to a second aspect, there is provided an aerodrome signalling unit, as set out in the present disclosure and in the appended claims. A plurality of such signalling units allow to provide the aerodrome signalling system of the first aspect.

According to a third aspect of the present disclosure, there is provided a control unit for an aerodrome signalling system, and a management system for an aerodrome signalling system. The control unit is advantageously comprised in the aerodrome signalling system of the first aspect. The management system is advantageously implemented in the aerodrome signalling system of the first aspect.

According to a fourth aspect of the present disclosure, there is provided a method of operating an aerodrome signalling system, such as the aerodrome signalling system of the first aspect.

BRIEF DESCRIPTION OF THE FIGURES

Aspects of the invention will now be described in more detail with reference to the appended drawings, wherein same reference numerals illustrate same features and wherein.

DETAILED DESCRIPTION

Figure 1:
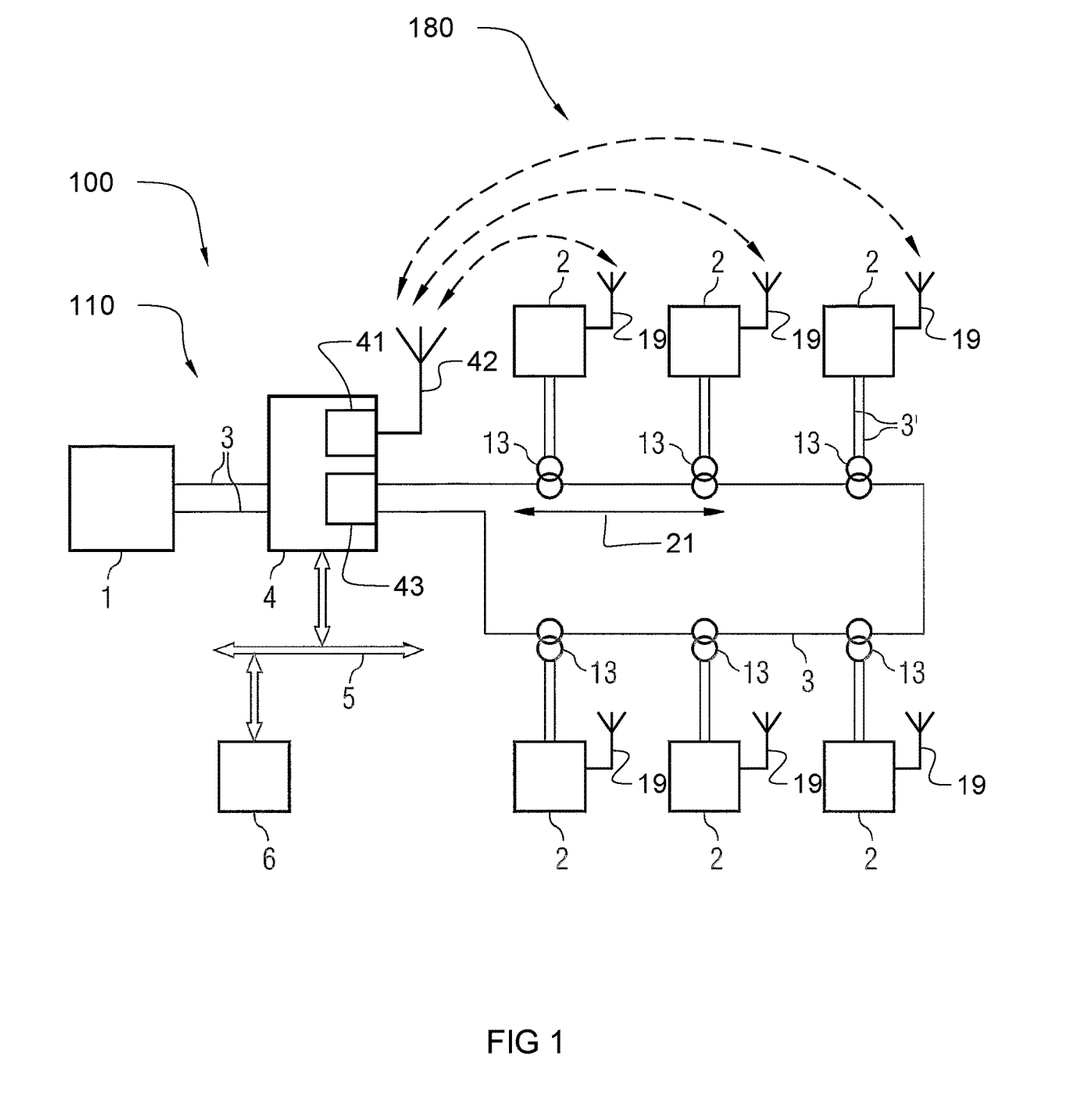
FIG. 1 represents a diagram of a signalling system for an aerodrome according to aspects as described herein.

Referring to FIG. 1, a signalling system 100 for an aerodrome, such as an airport, comprises a control unit 110 and a plurality of signalling units 2. The control unit comprises a power supply device 1, such as a constant current regulator (CCR), or a distributed parallel power system. The signalling units 2 are connected to the power supply device 1 via a power supply line 3. The power supply line 3 forms a series power supply circuit to which the signalling units 2 are connected in series. The power supply line 3 could, however, also form a parallel power circuit with the signalling units 2 connected in parallel.

The signalling units 2 comprise one or more signalling devices and one or more sensor devices. The signalling devices may refer to lighting devices, such as aeronautic ground lighting (AGL) devices as defined in ICAO (International Civil Aviation Organisation) Annex 14. The signalling devices may alternatively or additionally refer to visual guidance devices such as stop bars and airfield light signs. The sensor devices may refer to sensors suitable for use at an aerodrome site, such as direction sensors, sensors for aircraft detection and aircraft classification, torque sensors (e.g. for sensing or monitoring the torque applied by a bolt) and vibration sensors. The sensor devices may alternatively or additionally refer to, for example, devices for detection of wind direction and intensity and signalling thereof, as well as other types of detection and signalling apparatuses for meteorological or environmental data, such as temperature, humidity and light conditions. The signalling devices may alternatively or additionally refer to sensors for detection of gas and/or water in cable ducts, as well as visual detection devices, such as video cameras, for monitoring the runway area, taxiway area, Apron, and any other area of the aerodrome or airfield. It will be convenient to note that all the above sensors refer to non-cooperative sensors. In particular, these sensors do not co-operate with the aircraft or vehicle passing by, e.g. they are not configured to intercept signals emitted by such aircrafts or vehicles to make the detection.

The control unit 110 of the aerodrome signalling system 100 further comprises a central communication unit 4. The central communication unit 4 is advantageously looped in to the supply line 3. The signalling units 2 are therefore connected via the same supply line 3 to both the power supply device 1 and the central communication unit 4.

The central communication unit 4 is connected, e.g. via a data communication network 5, to a master control unit 6, which may be provided in proximity of the central communication unit 4, or remotely. The central communication unit 4 can receive from the master control unit 6 setpoint data which it forwards to the signalling units 2. Additionally, the central communication unit 4 can receive from the signalling units 2 status reports which it forwards to the master control unit 6. The master control unit 6 is in this way configured to operate as an aerodrome management system, as described, for example, in DE 101 04 950 A1, DE 199 49 737 A1 or EP 0 883 873 B1.

Figure 2:
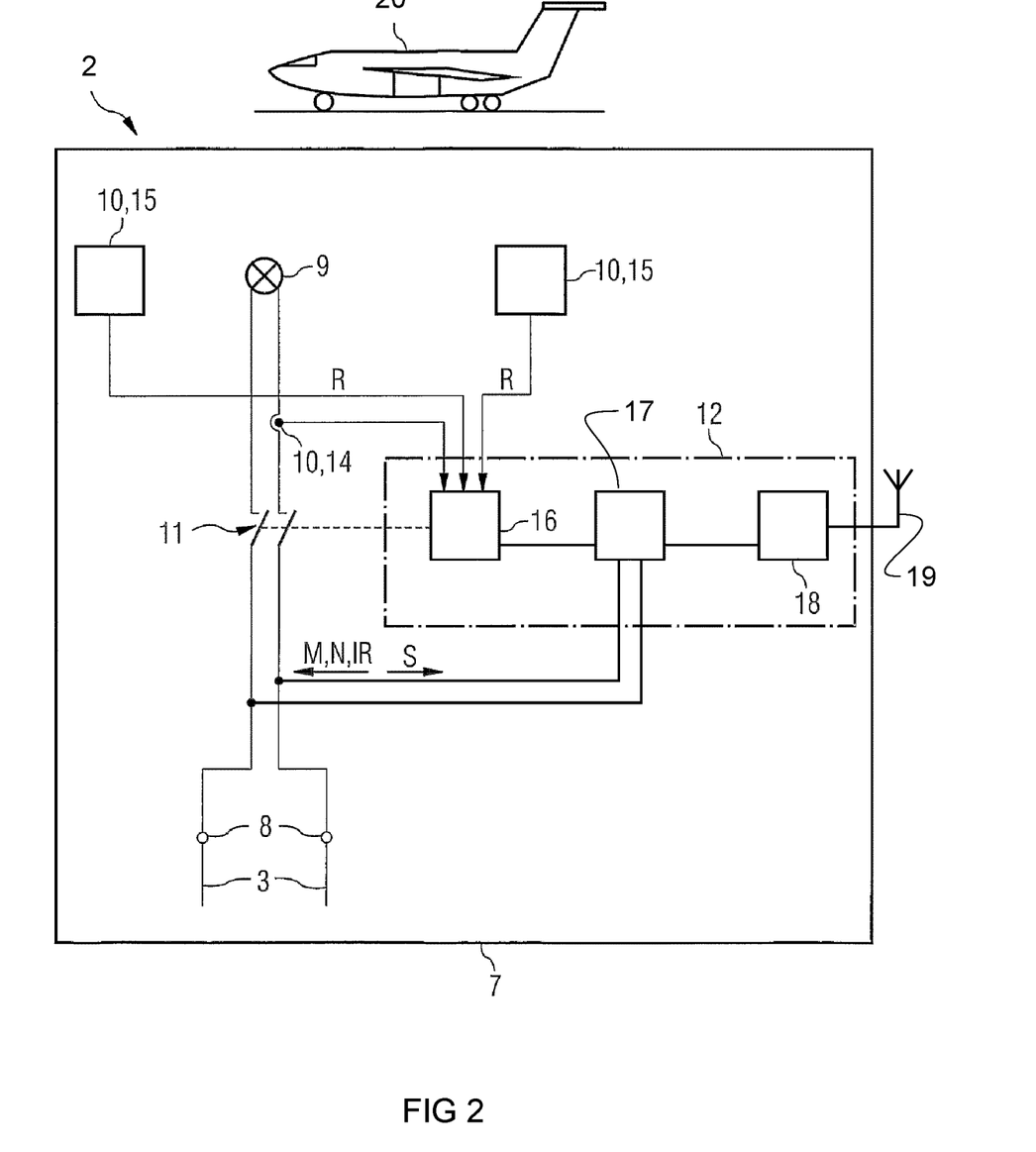
FIG. 2 represents a diagram of a first signalling unit used in the signalling system of FIG. 1.

Referring to FIG. 2, each signalling unit 2 comprises a base body 7 in which one or a plurality of signalling devices, such as a lighting device 9, and one or more sensor devices 10 as described above, and a local control unit 12 are arranged. Connection terminals 8 are provided in the base body 7 for connecting the one or more signalling devices 9, 10 to the power supply line 3. A switching device 11 can further be provided. The lighting device 9 can comprise one or a plurality of lights. The switching device 11 is configured to operate the lighting device 9, and/or any other switchable sensor device 10 arranged in the base body 7. The switching device 11 and the local control unit 12 are connected to the connection terminals 8.

Referring again to FIG. 1, a transformer 13 is connected to the connection terminals 8. The transformer 13 enables the connection of the signalling units 2 to the power supply line 3 while ensuring galvanic insulation. The connection can be effected via spur lines 3' which can have a line length up to 200 m, preferably 100 m or less. Alternatively, the transformer is connected downstream of the connection terminals 8, e.g. between connection terminals 8 and switching device 11 and/or local control unit 12. Transformer 13 can be provided outside, or inside base body 7.

According to one aspect, the central communication unit 4 comprises a first communication gateway device 41 coupled to a radio antenna 42. First communication gateway device 41 is configured for cellular data communication via antenna 42. The cellular data communication can be effected by the first gateway device 41 according to any suitable wireless data communication protocol for cellular radio communications, e.g. based on orthogonal frequency division multiplexing (OFDM), such as 4G, 5G, etc. The central communication unit 4 can additionally, or alternatively comprise a second communication gateway device 43, configured for wired data communication. In particular, second communication gateway device 43 is connected to power supply line 3 and configured for superimposing a communication signal on the power signal (voltage and/or current) through power supply line 3.

Referring again to FIG. 2, the local control unit 12 comprises a processing device 16, such as a microprocessor, and a third communication gateway device 18 coupled to a radio antenna 19. Third communication gateway device 18 is configured for cellular data communication via antenna 19. The cellular data communication can be effected by the third gateway device 18 according to any suitable wireless data communication protocol for cellular radio communications, e.g. based on orthogonal frequency division multiplexing (OFDM), such as 4G, 5G, etc. In addition, or alternatively, the local control unit 12 comprises a fourth communication gateway device 17 configured for wired data communication, in particular via power supply line 3. The third communication gateway device 18 and the fourth communication gateway device 17 are operably coupled to processing device 16.

According to one aspect, the first and the third communication gateway devices 41 and 18 are configured to communicate with one another, either unidirectionally, or bidirectionally, via respective antennas 42 and 19. The second and the fourth communication gateway devices 43 and 17 are configured to communicate with one another, either unidirectionally, or bidirectionally, advantageously via power supply line 3.

The central communication unit 4 is configured to transmit control signals S to the local control unit 12 of each signalling unit 2. The transmission of control signals S can be effected in different ways. According to a first possibility, as can be seen from FIGS. 1 and 2, control signals S are communicated as a message signal 21 via power supply line 3. In particular, signals S are superimposed on the AC (50 Hz or 60 Hz) voltage or current signal fed via power supply line 3 for supplying power to the signalling devices 9, 10. By way of example, signal S can be superimposed as an OFDM signal as described above, which can comprise one or more non-overlapping narrowband frequency channels, advantageously in a frequency range between 20 and 190 kHz. The frequency channels can be parameterized by the second or fourth communication gateway devices. Alternatively, signal S can be superimposed by time slot synchronization and using a controlled high impedance at the secondary side of the transformers 13 for communicating pulses contained in pulse signals, as described in WO 95/24820. It will be appreciated that yet alternative power line communication techniques as known in the art may be used in the systems described herein, in particular frequency modulation schemes for data communication, such as frequency-shift keying (FSK) signals transmitted via the power supply line.

The control signals S are transmitted by the second communication gateway device 43 as a superimposed message signal 21 via power supply line 3, and are received by the fourth communication gateway device 17. Each fourth communication gateway device 17 of the signalling units 2 can be separately addressable by the second communication gateway device 43 to receive a dedicated control signal S. The control signals S received by the fourth communication gateway device 17 are transferred to processing device 16 which is configured to process the control signals S for e.g. operating switching device 11 and/or one or more signalling devices 9, 10. Suitable examples of control commands are switching ON or OFF of the lighting device 9, controlling the light intensity of lighting device 9, querying a sensor device 10.

According to a second possibility, the control signals S are communicated as a wireless signal between the central communication unit 4 and the signalling units 2. To this end, the control signals S are transmitted by the first communication gateway device 41 via antenna 42 and are received by the third communication gateway device 18 of the signalling unit 2 via antenna 19. As already indicated above, the wireless communication between antenna 42 and antenna 19 can be effected according to any suitable cellular radio communication network protocol, such as 5G, specifically within a mission critical cellular private network.

The central communication unit 4 can be configured to select an appropriate transmission route for the control signals S, i.e. via a wired (devices 43/17) or wireless (devices 41/18) route. By way of example, the central communication unit 4 can be configured to select the transmission route based on the type of control signal S, e.g. control signals relating to operating the lighting device 9 sent via power supply line 3, whereas control signals relating to operating the sensor devices 10 sent wirelessly.

Either one of communication gateway devices 41 and 18 can be configured as a base station to set up a cellular communication network through which data can be transmitted via communication gateway devices 41, 18 and respective antennas 42 and 19. Alternatively, or in addition an external or remote device is configured as a base station to set up this cellular communication network. Communication gateway devices 41, 18 advantageously act as transceivers in the cellular network. The cellular communication network is advantageously a private cellular network, such as a private 5G cellular network, particularly configured for mission critical data communication. In the present disclosure, the term '5G' can refer to any radio access technology operating according to the International Mobile Telecommunications-2020 (IMT-2020) standard issued by the Radiocommunication Sector (ITU-R) of the International Telecommunication Union (ITU), and/or according to any one of the 5G radio access technologies set out by the 3GPP ($3^{rd}$ Generation Partnership Project) consortium, such as but not limited to 5G NR (New Radio), LTE-M (Machine Type communication) and NB-IoT (Narrowband Internet-of-Things). In the context of the present disclosure, the term '5G' can additionally refer to any further evolving cellular communication technology, such as 6G and 6GE, and which advantageously allows setting up private, i.e. non-public cellular radio communication networks, specifically for mission critical communication.

Referring to FIG. 2, the sensor device 10 can comprise a first sensor 14 and/or a second sensor 15. By means of the first sensor 14, an internal state of the lighting (signalling) device 9 can be detected and transmitted to the local control unit 12. For example, by means of the first sensor 14 it can be detected whether an electric current is flowing through the lighting device 9, or whether the lighting device 9 is emitting light, and possibly at which light intensity. The processing unit 16 can receive a measurement signal R from the first sensor and determine, e.g. in conjunction with the (known) switching state of switching device 11, whether the lighting device 9 is defective. A corresponding monitoring message M (e.g. switched on/switched off/flashing/defective) can optionally be transmitted by the local control unit 12 via the third gateway device 18 (wirelessly via antenna 19), or via the fourth gateway device 17 (e.g. as OFDM signal) to the central communication unit 4.

The second sensor 15 is configured to detect a state which prevails in the environment outside the signalling unit 2 or base body 7, e.g. a weather condition (temperature, humidity), or an environmental condition (ambient light intensity, day or night), or to detect objects passing by, such as aircraft or vehicles, in a non-cooperative manner. The second sensor can e.g. be configured as a magnetic-field sensor. The presence or absence of an object 20 can be detected by means of the magnetic-field sensors 15, particularly if the signalling unit 2 is installed in a take-off runway, a landing runway or a taxiway of an aerodrome. This applies particularly when the object 20 is a metal object, e.g. an aircraft 20 or a motor vehicle. When two second sensors 15 are arranged at a spaced apart distance along a motion direction (either in a same signalling unit 2, or in two different signalling units 2), the speed of the object 20 can also be determined. Alternatively, the second sensor 15 can be configured as a radar sensor, e.g. a microwave transceiver. In a further example, the second sensor 15 can be configured to detect a meteorological or environmental characteristic. The meteorological or environmental characteristic can, for example, be the temperature, the wind speed, precipitation (e.g. rain, snow) or visibility conditions (e.g. day/night/fog).

Other characteristics can alternatively or additionally be detected by means of the sensor device 10 or 15. Examples of such characteristics are vibrations, (external) noise, air or ground humidity, photometrics and internal states or operational conditions of the signalling unit 2 other than states or operational conditions referring to the lighting (signalling) device 9, the latter being captured by the first sensor 14. Any suitable sensor can be used for this purpose. Some examples of the second sensor 15 can be configured to monitor an operational condition of the base body 7 and/or any other structure related to the signalling unit 2 other than the lighting (signalling) device 2, e.g. torque sensors sensing the torque applied by e.g. a bolt and/or sensors for detection of gas and/or water, e.g. to monitor sealing conditions of the base body 7, such as broken window or loosened cover. Furthermore, the detection of objects and their identification can also be effected with non-cooperative sensors other than radar or magnetic-field sensors. For example, optical sensors (e.g. cameras) can be used, by which not only the presence of an object but also its shape and/or movement and movement direction may be detected.

The signal R generated by the second sensor 15 can be transmitted to the local control unit 12, which is processed by the processing device 16 to determine a useful signal N therefrom. The useful signal N can be transmitted by the local control unit 12 via the third communication gateway device 18 (wirelessly via antenna 19), or via the fourth communication gateway device 17 (e.g. as OFDM signal) to the central communication unit 4.

If the signalling units 2 operate on the basis of synchronization on a shared time base, it is also possible to transmit through signal N the respective detection time to the central communication unit 4. To this end, a time synchronization signal is advantageously received through antenna 19 and the third communication gateway device 18, e.g. within a mission critical private cellular radio communication network.

The local control unit 12 can further be configured to transmit to the central communication unit 4 a signal transmission request e.g. in the form of an interrupt request IR. This can be effected either via the fourth communication gateway device 17, as a superimposed message signal 21 via power supply line 3, or wirelessly—if applicable according to the communication protocol used—via the third communication gateway device 18. If, for example, one of the local control units 12 notices a defect in the lighting device 9, it can send a signal transmission request IR to the central communication unit 4, allowing the central communication unit 4 to address in a targeted manner the local control unit 12 from which the signal transmission request IR originated. The signal transmission request IR can comprise, in addition to an identifier of the signalling unit 2 (local control unit 12), a code, from which the central communication unit 4 can recognize the type of signals to be transmitted. For example, different codes can be used for recognizing an object 20, for modifying a meteorological identifying characteristic or for modifying an internal state of the aerodrome signalling unit (e.g. failure of the lighting device 9).

It is alternatively possible for the local control units 12 to feed not only an interrupt request IR, but along with it also the useful signal N itself to the central communication unit 4. Such type of transmission, however, requires some form of collision monitoring, as known in the art.

It will be appreciated that the wired communication via the second and fourth communication gateway devices 43, 17 can proceed through other cables than the power supply line, e.g. through dedicated data communication cables, such as optical fibres, when available.

It will be convenient to note that base body 7 can comprise a plurality of pairs of connection terminals 8 connected to one or more distinct signalling devices. The pairs of connection terminals 8 may be connected to distinct transformers 13. Base body 7 can hence refer to different types of installation enclosures, such as an in-ground pit, a manhole or an in-ground or elevated base.

Typically, transformers 13 are optimized for power transmission frequencies, but not for data signal transmission frequencies. They can therefore significantly dampen the transmitted data signals S, M, N, IR. To avoid such problems, dedicated transformers having reduced high frequency damping characteristics can be used, but at a penalty of increased cost. In addition, or alternatively, the second and fourth communication gateway devices 43, 17 preferably comprise repeaters for signal conditioning and amplification and means for measuring the reception strength and quality of the signals S, M, N, IR transmitted via the power supply line 3 as superimposed message signals. The reception strength and quality is also preferably transmitted via the power supply line 3 to the central communication unit 4. This advantageously allows the central communication unit 4 to monitor the condition of the overall communication system. By evaluating the information transmitted about transmission quality and signal strength, the central communication unit 4 is consequently advantageously able to configure the communication system for each individual transmission operation. In particular, the central communication unit 4 can, by transmitting corresponding control signals S, stipulate which of the fourth communication gateway devices 17 is to perform repeater functions in each case and which not. In this way, adequate transmission quality in the communication system is constantly ensured. At the same time, the power outlay needed for this, as well as crosstalk behaviour and background noise, can be optimized through dynamic adaptation of the wired communication network.

Figure 3:
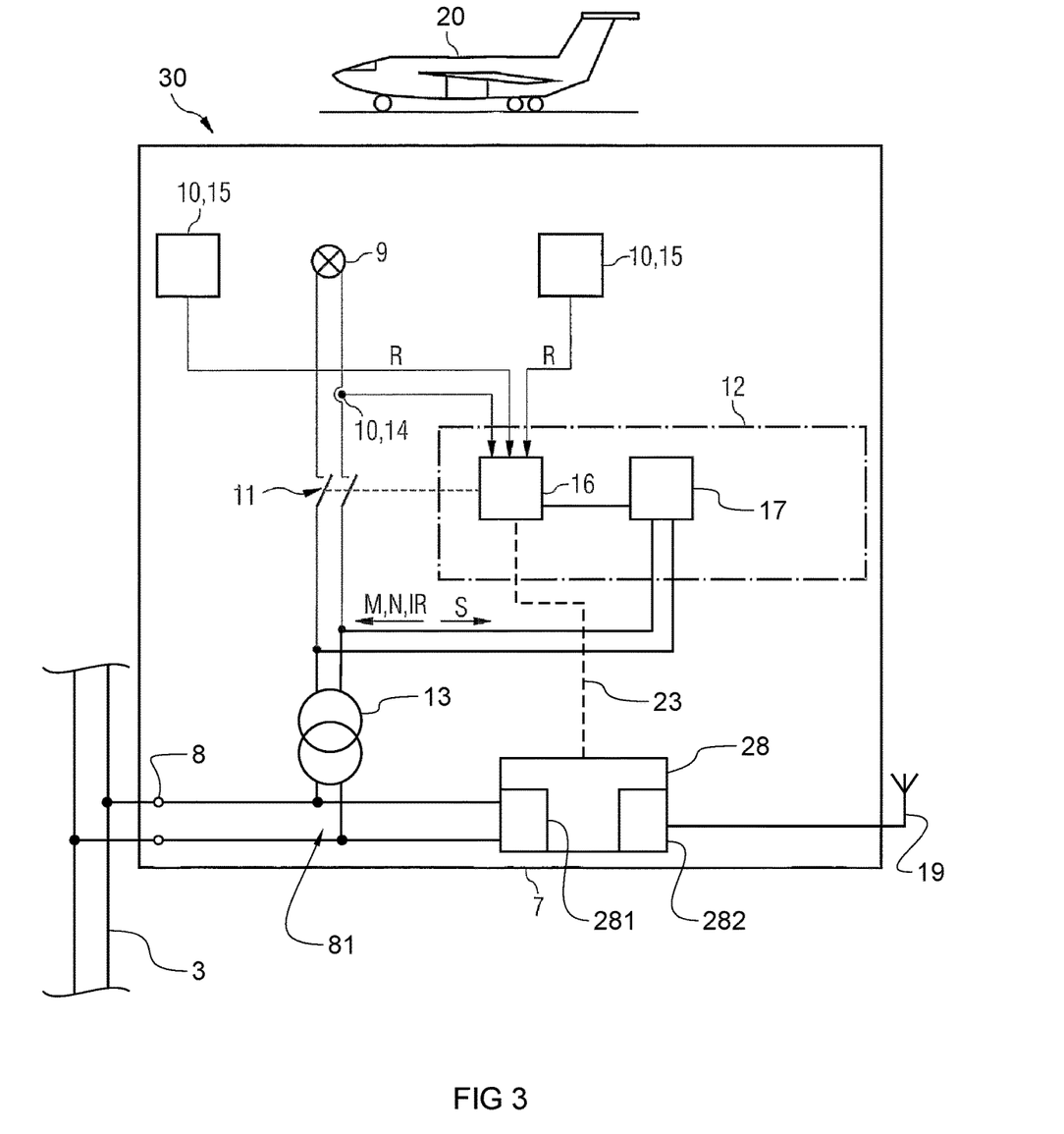
FIG. 3 represents a diagram of a second signalling unit that can be used in the signalling system of FIG. 1.

Referring to FIG. 3, an alternative embodiment of a signalling unit 30 differs from the signalling unit 2 of FIG. 2 in that it comprises a fifth communication gateway device 28 for cellular communication which is connected to the power supply line 3 through a connection node 81 upstream of transformer 13. The fifth communication gateway device 28 comprises a power line communication module 281 allowing to transmit and/or receive signals via power supply line 3, which may be similar to the fourth communication gateway device 17, and a cellular communication module 282 for wireless (cellular) communication of signals via antenna 19. The fifth communication gateway device 28 can be configured to wirelessly transmit, via antenna 19 through a cellular communication network, any data signals received via power supply line 3, or to feed into power supply line 3 any data signal received via antenna 19.

The fifth communication gateway device 28 can be coupled to the local control unit 12 for data communication through a (wired) data communication line 23. In this case, the fifth communication gateway device 28 can replace either one of the third and fourth communication gateway devices 18 and 17, or both, which therefore may be absent from the local control unit 12. In the example of FIG. 3, the fourth communication gateway device 17 is provided, whereas the third communication gateway device 18 is not provided.

One advantage of the fifth communication gateway device 28 is that it allows to provide a direct interface between the power supply line communication and the cellular communication network, bypassing the transformer 13. Consequently, the power line communication module 281 suffers much less from signal dampening by transformer 13. As a result, cheaper transformers 13 can be used and/or signal repeaters or conditioners can be dispensed with, resulting in more economical communication gateway devices. Furthermore, the network communication protocols implemented for power supply line communication may feature some similarities with the cellular network communication protocols used for wireless transmission via antenna 19, e.g. OFDM. By providing a direct link between the communication modules 281 and 282, signal conversion between the power line communication and the wireless (cellular) communication can be made easier.

Antenna 19 coupled to communication gateway device 18, 28, 58 or 68 as the case may be is advantageously configured to emit and/or receive radio signals in a frequency range defined by the cellular communication protocol (cellular network) that is used, e.g. 5G. As shown in FIGS. 2 and 3, antenna 19 is advantageously arranged outside base body 7 for optimal reception and/or transmission. Alternatively, antenna 19 can be arranged inside base body 7, or integrated into the body of base body 7. In these latter cases, base body 7 is advantageously made of a material that is transparent to radio waves, in particular in the frequency range used by antenna 19, such as a non-conducting material, a composite material, or both.

Figure 4:
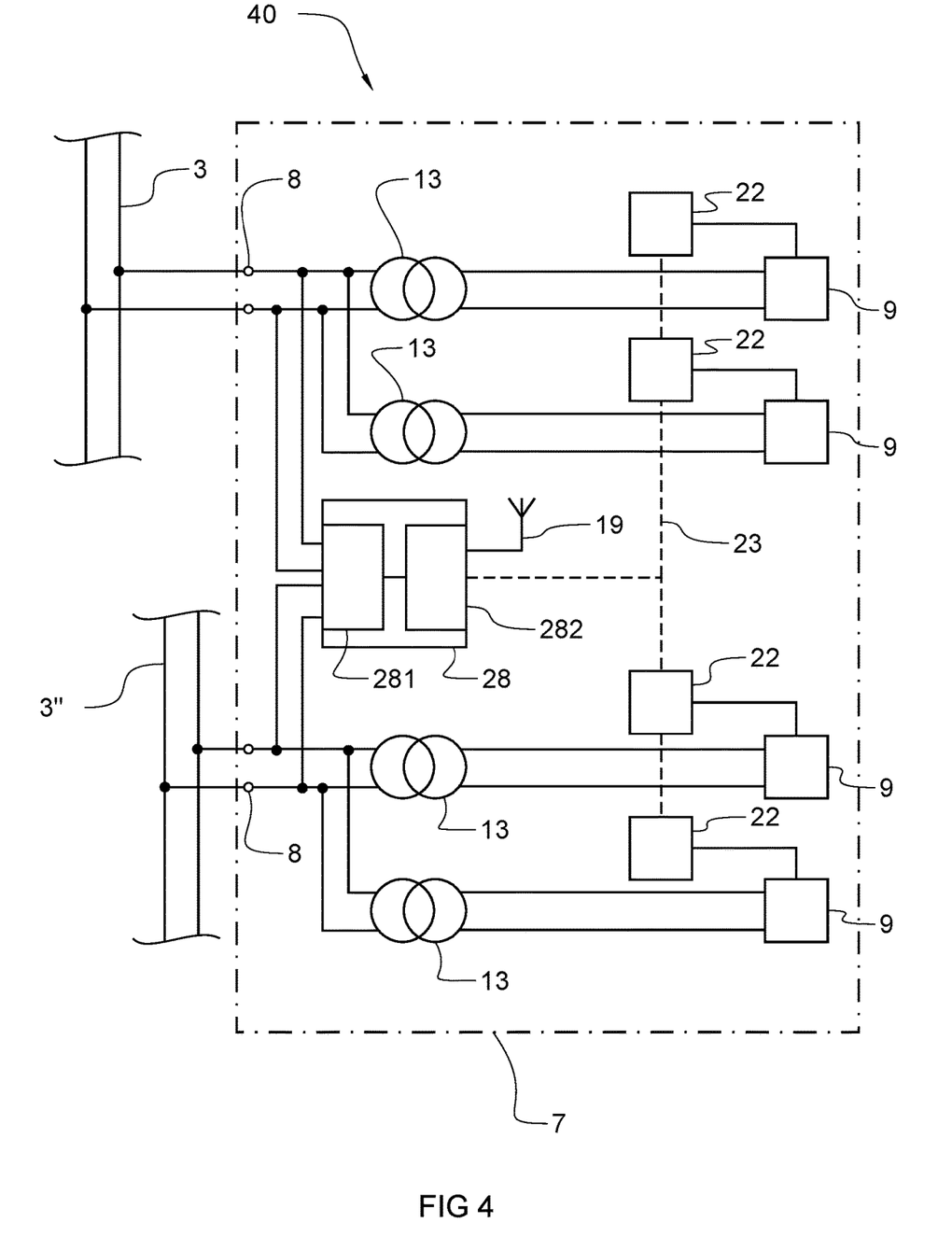
FIG. 4 represents a diagram of a third signalling unit for use in the signalling system of FIG. 1.

Referring to FIG. 4, the fifth communication gateway device 28 is particularly useful in larger manhole installations 40, in which multiple signalling devices 9, e.g. relating to a same or different aerodrome signalling circuits, and each provided with a distinct transformer 13 and local control unit 22, are arranged. In that case, it may be economical to provide just a single communication gateway device 28 with communication capability with the power supply lines 3, 3" of each of the different signalling circuits. The fifth communication gateway device 28 can be operably coupled to each of the local control units 22 via a (wired) data communication line 23. In this case, the fifth communication gateway device 28 can replace either one or both the third and fourth communication gateway devices 18, 17 of the local control units 22. Hence, the local control units 22 do not need to comprise either one or both the third and fourth communication gateway devices 18 and 17.

Alternatively, the fifth communication gateway device 28 can communicate with the fourth communication gateway devices 17 of the local control units 22 of the various signalling devices via power line communication module 281. This can be effected via message signals sent via the power supply lines 3, 3" (superimposed on the power signals). In this case, the data communication line 23 can be dispensed with. The power line communication module 281 is connected with the cellular communication module 282 for receiving and/or transmitting any data signals through a cellular network. The cellular communication module 282 can hence operate as a cellular communication gateway device for the local control units 22, which do not need to be provided with a third communication gateway device 18.

Figure 5:
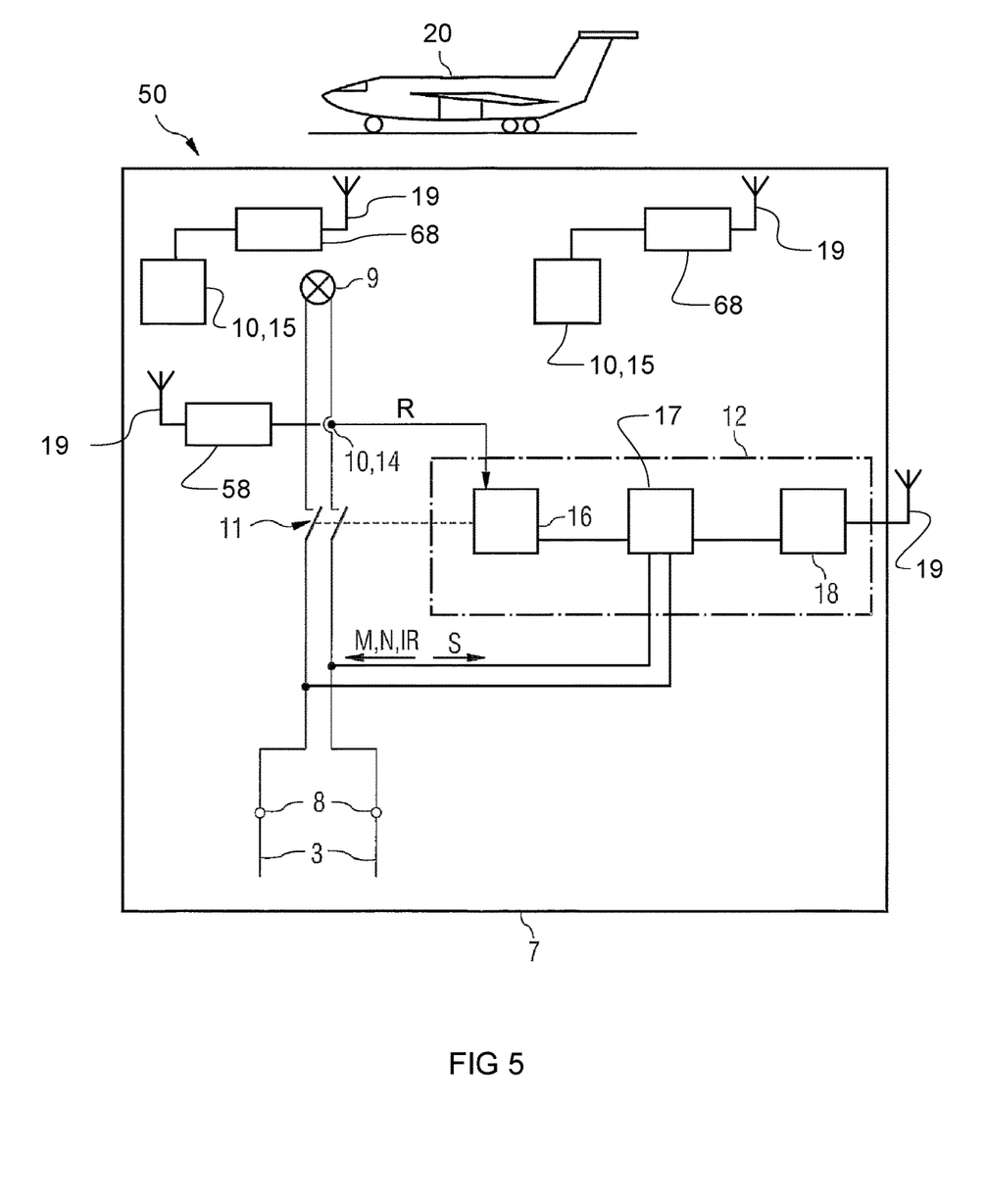
FIG. 5 represents a diagram of a fourth signalling unit for use in the signalling system of FIG. 1.

Referring to FIG. 5, yet another embodiment of a signalling unit 50 differs from signalling unit 2 of FIG. 2 in that one or more signalling devices 14, 15 comprise their own, distinct cellular communication gateway device 58, 68 directly coupled thereto. By way of example, the sensor (signalling) device 14 comprises a dedicated cellular communication gateway device 58 and respective antenna 19. The sensor (signalling) device 15 comprises a dedicated cellular communication gateway device 68 and respective antenna 19. The cellular communication gateway devices 58, 68 may or may not be operably connected to the local control unit 12, i.e. direct data communication between local control unit 12 and cellular communication gateway devices 58, 68 may or may not be possible.

Cellular communication gateway devices 58, 68 may be configured to receive measurement and/or monitoring signals from the signalling devices 14, 15 to which they are coupled, and to transmit the measurement and/or monitoring signals wirelessly via their respective antennas 19 over a cellular network. The local control unit 12 may in this case still comprise the third communication gateway device 18, e.g. for cellular communication of signals, in particular control signals S, relating to operation or monitoring of the lighting device 9. Alternatively, a cellular communication gateway device (not shown) can be directly coupled to lighting device 9, which may or may not be operably connected to processing device 16. Such a type of installation may be particularly useful in case of retrofitting existing installations, or when additional signalling devices, such as sensor or lighting devices, are added to the signalling unit 50 and for which no communication protocol exists via power supply line 3.

It will be appreciated that some sensor devices, such as sensors 15, arranged within a signalling unit 2, 30, 40, 50, can be provided with their own power sources. Alternatively, the sensor devices can draw power from the power supply line 3.

Figure 6:
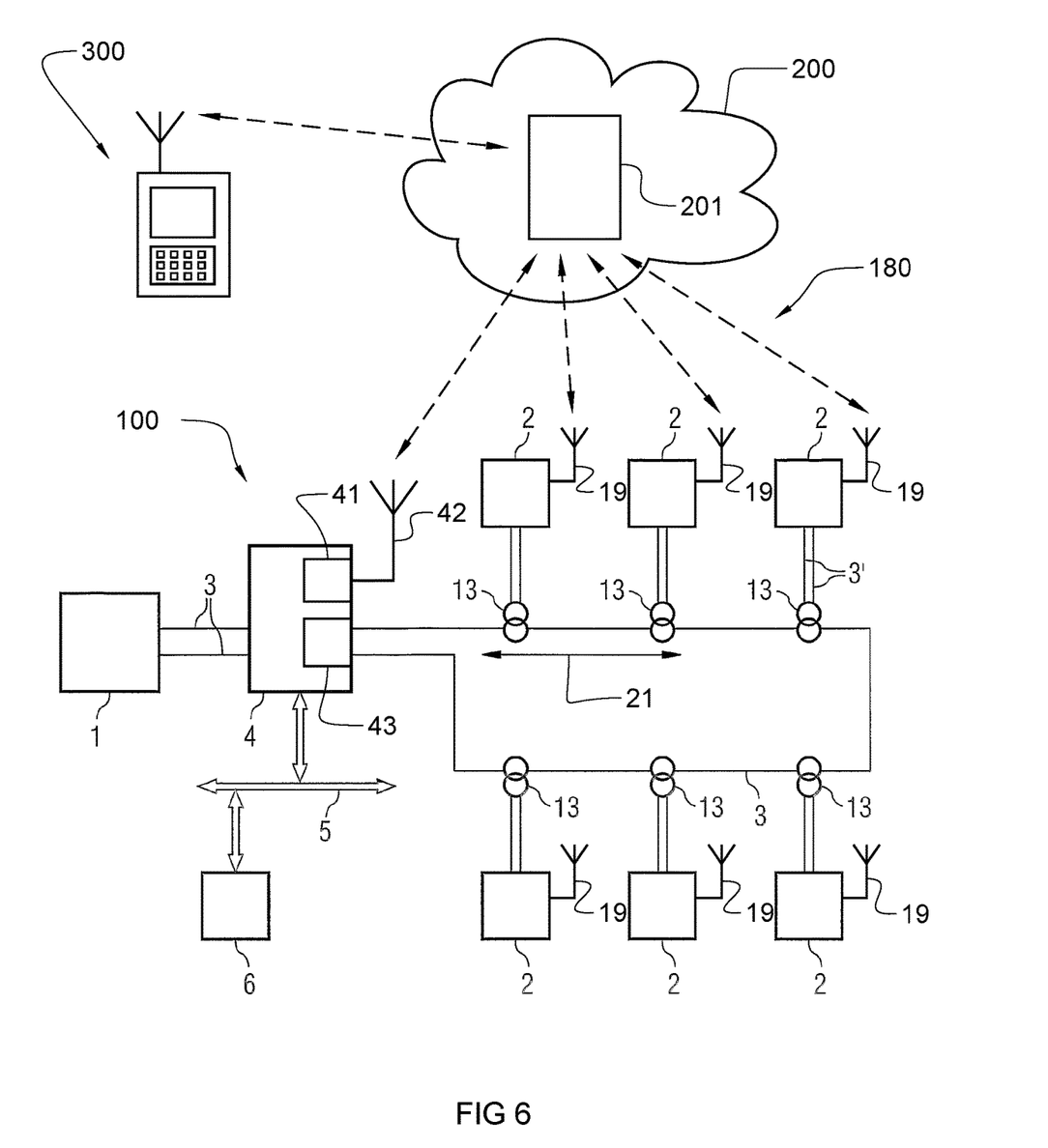
FIG. 6 represents a diagram of the signalling system of FIG. 1 with cellular data communication capability to a cloud network.

Referring to FIG. 6, any one of the cellular communication gateway devices 41, 18, 282, 58, 68 described previously is advantageously configured to communicate with a cloud network 200 via a cellular network 180. Cloud network 200 comprises a data storage system 201 which may store data in relation to one or more of the signalling devices 9, 10 and/or of the power supply unit 1 of the signalling system 100. Such data is transmitted by one or more of the various cellular communication gateway devices described hereinabove over the cellular network 180 and may comprise identifier data, monitoring data and/or operational data, possibly along with respective time stamps.

By way of example, the first communication gateway device 41 can be configured to wirelessly transmit via cellular network 180 monitoring data in relation to the power supply unit 1, or of the overall signalling system, e.g. transformer impedance measurements, to the cloud network 200. The communication gateway devices 18, 28, 58, 68 can be configured to wirelessly transmit via cellular network 180 monitoring data in relation to a lighting device 9 and/or measurement data from one or more sensor devices 10 to the cloud network 200. The cellular communication capability of the central communication unit and/or of the signalling units hence allows an increased amount of data to be transmitted. Therefore, systems as described herein allow to gather additional data in relation to operation and status condition of the signalling system 100 compared to the prior art systems. This data is advantageously used to improve maintenance of the signalling system, and/or to provide improved awareness relating to a malfunctioning or defect of the signalling system.

Data storage system 201 may be a remote system, e.g. where the data is stored in a cloud system. In this case, part or all of the data communicated from the cellular communication gateway devices of the signalling system to the cloud network 200 can also be stored locally, e.g. in a data storage system linked to master control unit 6. Hence, the data communicated to and/or stored in cloud network 200 may be redundant. Alternatively, data storage system 201 may be a local system, e.g. arranged in the ATC tower or on the aerodrome field, and may or may not be linked to the master control unit 6.

A user interface 300, such as a computer, handheld tablet or mobile device, advantageously with cellular network communication capabilities, used by maintenance operators, can communicate (wirelessly, over cellular network 180) with cloud network 200 to access the data relating to signalling system 100 stored in data storage system 201. This allows maintenance operators to access maintenance-relevant data of the signalling system 100 more easily, even from remote locations.

It will be appreciated that the cellular communication gateway devices as described herein can feature any one or both of the cellular communication capabilities as described above in relation to FIG. 1 and FIG. 6.

Advantageously, the local control unit 12, or the fifth communication gateway device 28 can be configured to act as a communication bridge between the wired (power line) communication and the cellular communication network. By way of example, message signals 21 transmitted via power supply line 3 can be received by the fourth communication gateway device 17, or the communication module 281, and, once appropriately converted (e.g. by processing device 16), transmitted to respectively the third communication gateway device 18 or the cellular communication module 282 for wireless transmission, or vice versa. In particular, some signalling units 2 may act as communication hubs where data is collected from nearby signalling units and transferred between the wired communication network (power supply line 3) and the cellular communication network. This may also obviate the need of signal repeaters and amplifiers on the power supply line 3.

Embodiments of the present disclosure are defined by the following numbered clauses:

A1. Aerodrome signalling system (100), comprising:
a plurality of signalling units (2, 30, 40, 50), each comprising at least one aerodrome signalling device (9, 10),
a control unit (1, 6) configured to control operation of the plurality of signalling units (2, 30, 40, 50),
a central communication unit (4) operably coupled to the control unit and configured for data communication (S) with the plurality of signalling units (2, 30, 40, 50),
characterised in that one or more of the central communication unit (4) and the plurality of signalling units (2, 30, 40, 50) comprise a wireless data communication device (18, 28, 58, 68) configured for wireless data communication.

A2. Aerodrome signalling system of clause A1, comprising a power source (1) and a power supply line (3) connecting the power source with the plurality of signalling units (2, 30, 40, 50).

A3. Aerodrome signalling system of the preceding clause, wherein the plurality of signalling units (2, 30, 40, 50) each comprise a first communication device (17, 281) coupled to the power supply line, and wherein the central communication unit (4) is coupled to the power supply line (3) and is configured for data communication with the first communication devices (17, 281) via the power supply line.

A4. Aerodrome signalling system of the preceding clause, wherein the first communication devices (17, 281) are configured to operate the at least one aerodrome signalling device (9, 10) of the respective signalling unit (2, 30, 40, 50).

A5. Aerodrome signalling system of any one of the preceding clauses, wherein the central communication unit (4) comprises a first wireless data communication device (41).

A6. Aerodrome signalling system of the preceding clause, wherein the central communication unit (4) is configured to receive data from one or more of the plurality of signalling units (2, 30, 40, 50) and/or the control unit (6) and to transmit at least part of the data via the first wireless data communication device (41) to a remote data storage system (201).

A7. Aerodrome signalling system of the preceding clause, comprising a local data storage system, wherein the central communication unit (4) is configured to transmit the at least part of the data to the local data storage system in addition to wireless transmission to the remote data storage system (201).

A8. Aerodrome signalling system of clause A6 or A7, wherein the data comprises data for monitoring an operational status of one or more of the control unit (6) and the plurality of signalling units (2, 30, 40, 50), preferably wherein the data comprises identifier data of the respective signalling unit or control unit.

A9. Aerodrome signalling system of any one of the preceding clauses, wherein the plurality of signalling units (2, 30, 40, 50) each comprise a second wireless communication device (18, 28) for wireless data communication.

A10. Aerodrome signalling system of the preceding clause, wherein the signalling units (2, 30, 40, 50) each comprise at least one sensor (10) for capturing measurement data in relation to one or more of: a status condition of the respective signalling device, an environmental condition and a presence of a foreign object, and wherein the at least one sensor (10) is configured to communicate the measurement data to the second wireless communication device.

A11. Aerodrome signalling system of clause A9 or A10, wherein the second wireless communication device (18, 28) is configured to receive first data from the respective signalling unit (2, 30, 40, 50) and/or the measurement data from the at least one sensor and to transmit the first data and/or the measurement via the second wireless communication device (18, 28).

A12. Aerodrome signalling system of any one of clauses A9-A11 in combination with clause 5, wherein the central communication unit (4) is configured for wireless data communication with the plurality of signalling units (2, 30, 40, 50) via the first wireless data communication device (41) and the second wireless communication device (18, 28).

A13. Aerodrome signalling system of any one of the clauses A9 to A12, comprising a power source (1) and a power supply line (3) connecting the power source with the plurality of signalling units (2, 30, 40, 50), wherein the plurality of signalling units each comprise a first gateway device (17) coupled to the power supply line (3), and wherein the central communication unit (4) comprises a second gateway device (43) coupled to the power supply line (3), wherein the second gateway device is configured for data communication with the first gateway devices via the power supply line.

A14. Aerodrome signalling system of clause A13, wherein the central communication unit (4) is configured for data communication with the plurality of signalling units (2, 30, 40, 50) selectively via the first and second wireless communication devices and via the power supply line.

A15. Aerodrome signalling system of any one of the preceding clauses, wherein the (first and/or second) wireless data communication device is configured to receive and/or transmit according to a wireless cellular communication protocol, preferably the wireless communication device is configured to receive and/or transmit 5G radio signals.

A16. Aerodrome signalling system of any one of the preceding clauses, wherein the aerodrome signalling device (9) is an aeronautic ground light, an aerodrome sign, an aerodrome guard light, or an aerodrome sensing device (14, 15).

A17. Aerodrome signalling unit (2, 30, 40, 50), comprising:
- an enclosure (7),
- a connection terminal (8) for connection to a power supply line (3),
- at least one aerodrome signalling device (9, 10),
- an electric transformer (13) coupled between the connection terminal (8) and the aerodrome signalling device (9, 10), characterised in that the aerodrome signalling unit comprises a first communication device (18, 28, 58, 68) coupled to the at least one aerodrome signalling device (9, 10), wherein the first communication device is configured for wireless data communication.

A18. Aerodrome signalling unit of the preceding clause, wherein the first communication device is configured to wirelessly receive control commands (S) for operating the at least one aerodrome signalling device (9, 10).

A19. Aerodrome signalling unit of any one of the two preceding clauses, comprising at least one sensor (14, 15) for measuring data (R) representative of a condition or event inside or outside the enclosure (7), and wherein the at least one sensor (14, 15) is configured to communicate the data (R) to the first communication device (18, 28, 58, 68).

A20. Aerodrome signalling unit of any one of the clauses A17-A19, wherein the first communication device (18, 28, 58, 68) is configured to receive first data representative of an operating status from the at least one aerodrome signalling device (9, 10) and/or to receive measurement data from the at least one sensor (14, 15) and to transmit the first data and/or the measurement data via a wireless data communication network.

A21. Aerodrome signalling unit of any one of the clauses A17-A20, comprising a second communication device (17, 281) coupled to the connection terminal (8), wherein the second communication device is configured for data communication via the power supply line (3), in particular to receive control commands (S) for operating the aerodrome signalling device (9, 10).

A22. Aerodrome signalling unit of the preceding clause, wherein the second communication device (281) is connected to the power supply line (3) at a connection node between the connection terminals (8) and the electric transformer (13), wherein the first communication device (282) and the second communication device (281) are configured to exchange data signals between each other.

A23. Aerodrome signalling unit of any one of the clauses A17-A22, comprising a radio antenna (19) operably coupled to the first communication device (18, 28, 58, 68), in particular for cellular communication.

A24. Aerodrome signalling unit of the preceding clause, wherein the radio antenna (19) is arranged outside the enclosure (7).

A25. Aerodrome signalling unit of clause A23, wherein the radio antenna (19) is arranged inside the enclosure (7).

A26. Aerodrome signalling unit of clause A25, wherein the enclosure is made of a material substantially transparent to radio waves, in particular a composite material, particularly a fiber reinforced composite material.

A27. Control unit for an aerodrome signalling system, comprising:
- a power supply unit (1) configured to supply at least one aerodrome signalling device (9, 10) of the aerodrome signalling system with electrical power via a power supply line (3),
- a central communication unit (4) for communicating control signals (S) to the at least one aerodrome signalling device, characterised in that the central communication unit (4) comprises a first communication device (41) configured for wireless data communication.

A28. Control unit of the preceding clause, wherein the central communication unit (4) is configured to communicate first data representative of a condition of the power supply unit (1) to the first communication device (41) for wireless transmission thereof.

A29. Control unit of any one of the two preceding clauses, comprising a second communication device (43) configured for data communication with the at least one signalling device via the power supply line (3), in particular for transmitting the control signals (S) for operating the at least one signalling device (9, 10) and/or for receiving second data representative of a condition of the at least one signalling device (9, 10).

A30. Control unit of any one of the clauses A27-A29, wherein the central communication unit (4) is configured to receive second data representative of a condition of the aerodrome signalling system and to transmit the second data to the first communication device (41) for wireless transmission thereof.

A31. Control unit of any one of the clauses A27-A30, wherein the first communication device (41) comprises a radio antenna (42), in particular for cellular communication.

A32. Management system for an aerodrome signalling system, comprising the control unit of clause A30, and further comprising a data storage system (201), wherein the first communication device (41) is configured for wireless transmission of the second data to the data storage system.

A33. Method of operating an aerodrome signalling system, wherein the aerodrome signalling system comprises a control unit and a plurality of signalling units each provided with at least one aerodrome signalling device, the method comprising:
- gathering operational status data from the at least one signalling device, and
- wirelessly transmitting the gathered operational status data to a remote data storage system.

A34. Method of the preceding clause, wherein the gathered operational status data is retrieved from the remote data storage system by a user interface, preferably a portable user interface.

A35. Method of any one of the two preceding clauses, wherein the gathered operational status data is transmitted through a wireless cellular communication network, preferably wherein the gathered operational status data is retrieved from the remote data storage system through a wireless cellular communication network.

A36. Method of any one of the clauses A33-A35, comprising sending operating commands to the signalling units for operating the at least one signalling device, wherein the operating commands are sent via a power supply line communication and/or via wireless transmission.

B1. Aerodrome signalling system (100), comprising:
  a plurality of signalling units (2, 30, 40, 50), each comprising at least one aerodrome signalling device (9, 10),
  a control unit (1, 6) configured to control operation of the plurality of signalling units (2, 30, 40, 50),
  a central communication unit (4) operably coupled to the control unit and configured for data communication (S) with the plurality of signalling units (2, 30, 40, 50),
  characterised in that one or more of the central communication unit (4) and the plurality of signalling units (2, 30, 40, 50) comprise a wireless data communication device (18, 282, 41, 58, 68) configured for cellular data communication.

B2. Aerodrome signalling system of clause B1, comprising a power source (1) and a power supply line (3) connecting the power source with the plurality of signalling units (2, 30, 40, 50).

B3. Aerodrome signalling system of the preceding clause, wherein the plurality of signalling units (2, 30, 40, 50) each comprise a first communication device (17, 281) coupled to the power supply line, wherein the central communication unit (4) is coupled to the power supply line (3) and is configured for data communication with the first communication devices (17, 281) via the power supply line, preferably wherein the first communication devices (17, 281) are configured to operate the at least one aerodrome signalling device (9, 10) of the respective signalling unit (2, 30, 40, 50).

B4. Aerodrome signalling system of any one of the preceding clauses, wherein the central communication unit (4) comprises a first one of the wireless data communication device (41).

B5. Aerodrome signalling system of the preceding clause, wherein the central communication unit (4) is configured to receive first data from one or more of the plurality of signalling units (2, 30, 40, 50) and/or the control unit (6) and to transmit at least part of the first data via the first wireless data communication device (41) via a cellular network (180) to a remote data storage system (201).

B6. Aerodrome signalling system of clause B5, wherein the first data comprises data for monitoring an operational status of one or more of the control unit (6) and the plurality of signalling units (2, 30, 40, 50), preferably wherein the first data comprises identifier data of the respective signalling unit or control unit.

B7. Aerodrome signalling system of any one of the preceding clauses, wherein the plurality of signalling units (2, 30, 40, 50) each comprise a second one of the wireless communication device (18, 28) configured for cellular data communication.

B8. Aerodrome signalling system of the preceding clause, wherein the plurality of signalling units (2, 30, 40, 50) each comprise at least one sensor device (15) for capturing measurement data in relation to one or more of: an environmental condition, a meteorological condition and a presence of a foreign object, and wherein the at least one sensor device (15) is configured to communicate the measurement data to the second wireless communication device for transmission via a cellular network (180).

B9. Aerodrome signalling system of clause B7 or B8, in combination with clause 5, wherein the central communication unit (4) is configured for wireless data communication with the plurality of signalling units (2, 30, 40, 50) via the first wireless data communication device (41) and the second wireless communication device (18, 28) over a cellular network (180).

B10. Aerodrome signalling system of any one of the clauses B7 to B9, comprising a power source (1) and a power supply line (3) connecting the power source with the plurality of signalling units (2, 30, 40, 50), wherein the plurality of signalling units each comprise a first gateway device (17) coupled to the power supply line (3), and wherein the central communication unit (4) comprises a second gateway device (43) coupled to the power supply line (3), wherein the second gateway device is configured for data communication with the first gateway devices via the power supply line.

B11. Aerodrome signalling system of the preceding clause, wherein the central communication unit (4) is configured for data communication with the plurality of signalling units (2, 30, 40, 50) selectively via the first and second wireless communication devices over a cellular network (180) and via the power supply line (3).

B12. Aerodrome signalling system of any one of the preceding clauses, wherein the wireless data communication device is configured to receive and/or transmit 5G radio signals.

B13. Aerodrome signalling system of any one of the preceding clauses, wherein the aerodrome signalling device (9) comprises a lighting device.

B14. Aerodrome signalling system of the preceding clause, wherein the aerodrome signalling device (9) is an aeronautic ground light, an aerodrome sign, or an aerodrome guard light.

B15. Aerodrome signalling unit (2, 30, 40, 50), comprising:
  an enclosure (7),
  a connection terminal (8) for connection to a power supply line (3),
  at least one aerodrome signalling device (9, 10),
  an electric transformer (13) coupled between the connection terminal (8) and the aerodrome signalling device (9, 10),
characterised in that the aerodrome signalling unit comprises a first communication device (18, 28, 58, 68) coupled to the at least one aerodrome signalling device (9, 10), wherein the first communication device is configured for cellular data communication.

B16. Aerodrome signalling unit of the preceding clause, wherein the first communication device is configured to wirelessly receive control commands (S) for operating the at least one aerodrome signalling device (9, 10).

B17. Aerodrome signalling unit of any one of the two preceding clauses, comprising at least one sensor (14, 15) for measuring data (R) representative of a condition or event outside the enclosure (7), and wherein the at least one sensor (14, 15) is configured to communicate the data (R) to the first communication device (18, 28, 58, 68).

B18. Aerodrome signalling unit of clause B17, wherein the first communication device (18, 28, 58, 68) is configured to receive first data representative of an operating status from the at least one aerodrome signalling device (9, 10) and/or to receive measurement data from the at least one sensor (14, 15) and to transmit the first data and/or the measurement data via a cellular network (180).

B19. Aerodrome signalling unit of any one of the clauses B15-B18, further comprising a second communication device (17, 281) coupled to the connection terminal (8), wherein the second communication device is configured for data communication via the power supply line (3), in particular to receive control commands (S) for operating the aerodrome signalling device (9, 10).

B20. Aerodrome signalling unit of the preceding clause, wherein the second communication device (281) is connected to the power supply line (3) at a connection node (81)

upstream of the electric transformer (13), wherein the first communication device (282) and the second communication device (281) are configured to exchange data signals between each other.

B21. Aerodrome signalling unit of any one of the clauses B15-B20, comprising a radio antenna (19) for cellular communication operably coupled to the first communication device (18, 282, 58, 68).

B22. Aerodrome signalling unit of the preceding clause, wherein the radio antenna (19) is arranged outside the enclosure (7).

B23. Aerodrome signalling unit of clause B21, wherein the radio antenna (19) is arranged inside the enclosure (7).

B24. Aerodrome signalling unit of clause B23, wherein the enclosure comprises a material substantially transparent to radio waves, in particular a composite material, particularly a fiber reinforced composite material.

B25. Control unit (110) for an aerodrome signalling system, the control unit comprising:
- a power supply unit (1) configured to supply at least one aerodrome signalling device (9, 10) of the aerodrome signalling system with electrical power via a power supply line (3),
- a central communication unit (4) for communicating control signals (S) to the at least one aerodrome signalling device, characterised in that the central communication unit (4) comprises a first communication device (41) configured for cellular data communication.

B26. Control unit of the preceding clause, wherein the central communication unit (4) is configured to communicate first data representative of a condition of the power supply unit (1) to the first communication device (41) for wireless transmission thereof via a cellular network (180).

B27. Control unit of any one of the two preceding clauses, further comprising a second communication device (43) configured for data communication with the at least one signalling device via the power supply line (3), in particular for transmitting the control signals (S) for operating the at least one signalling device (9, 10) and/or for receiving second data representative of a condition of the at least one signalling device (9, 10).

B28. Control unit of any one of the clauses B25 to B27, wherein the first communication device (41) comprises a radio antenna (42) for cellular communication.

B29. Control unit of any one of the clauses B25 to B28, wherein the central communication unit (4) is configured to receive second data representative of a condition of the aerodrome signalling system and to transmit the second data to the first communication device (41) for wireless transmission thereof.

B30. Management system for an aerodrome signalling system, comprising the control unit of clause B29, and further comprising a data storage system (201) and a mobile user interface (300), wherein the first communication device (41) is configured for wireless transmission of the second data to the data storage system over a cellular network (180), and wherein the mobile user interface (300) is configured to access the second data stored in the data storage system (201) via the cellular network (180).

B31. Method of operating an aerodrome signalling system (100), wherein the aerodrome signalling system comprises a control unit (110) and a plurality of signalling units (2) each provided with at least one aerodrome signalling device (9), the method comprising:
- gathering operational status data from the at least one signalling device, and
- wirelessly transmitting the gathered operational status data to a remote data storage system (201) over a cellular network (180).

B32. Method of the preceding clause, wherein the gathered operational status data is retrieved from the remote data storage system by a user interface, preferably a portable user interface via the cellular network (180).

B33. Method of clause B31 or B32, comprising sending operating commands to the signalling units (2) for operating the at least one signalling device, wherein the operating commands are sent via a power supply line communication and/or via wireless transmission over the cellular network.

The invention claimed is:

1. An aerodrome signalling system, comprising:
a plurality of signalling units, each comprising at least one aerodrome signalling device,
a control unit configured to control operation of the plurality of signalling units,
a central communication unit operably coupled to the control unit and configured for data communication with the plurality of signalling units,
wherein the plurality of signalling units each comprise at least one sensor device configured to capture measurement data in relation to one or more of: an environmental condition, a meteorological condition, a presence of an object, a movement of an object and a status condition relating to the respective signalling unit other than a status condition of the respective at least one signalling device,
wherein the plurality of signalling units each comprise a first wireless data communication device configured for cellular data communication,
and wherein the at least one sensor device is configured to communicate the measurement data to the first wireless data communication device for transmission via a cellular network.

2. The aerodrome signalling system of claim 1, wherein the central communication unit comprises a second wireless data communication device configured for cellular data communication.

3. The aerodrome signalling system of claim 2, wherein the central communication unit is configured to receive first data from one or more of: the plurality of signalling units and/or the control unit, wherein the central communication unit is configured to transmit at least part of the first data via the second wireless data communication device over the cellular network to a remote data storage system.

4. The aerodrome signalling system of claim 3, wherein the first data comprises data for monitoring an operational status of one or more of the control unit and the plurality of signalling units.

5. The aerodrome signalling system of claim 1, further comprising a power source and a power supply line connecting the power source with the plurality of signalling units, wherein the plurality of signalling units each comprise a first gateway device coupled to the power supply line, and wherein the central communication unit comprises a second gateway device coupled to the power supply line, wherein the second gateway device is configured for data communication with the first gateway devices via the power supply line.

6. The aerodrome signalling system of the claim 5, wherein the central communication unit is configured for data communication with the plurality of signalling units selectively via the first and wireless communication devices and via the power supply line.

7. The aerodrome signalling system of claim 1, wherein the first wireless data communication device is configured to receive, to transmit, or to receive and transmit 5G radio signals.

8. The aerodrome signalling system of claim 1, wherein the cellular network is a private cellular network.

9. The aerodrome signalling system of claim 1, wherein the aerodrome signalling device comprises a lighting device and wherein the aerodrome signalling device is an aeronautic ground light, an aerodrome sign, an aerodrome guard light or an aerodrome visual guidance device.

10. An aerodrome signalling unit, comprising:
an enclosure,
a connection terminal for connection to a power supply line,
at least one aerodrome signalling device,
an electric transformer coupled between the connection terminal and the aerodrome signalling device,
at least one sensor for capturing measurement data representative of one or more of: an environmental condition, a meteorological condition, a presence of an object, a movement of an object and a status condition relating to the respective signalling unit other than a status condition of the respective at least one signalling device,
wherein the aerodrome signalling unit comprises a first wireless data communication device configured for cellular data communication, and
wherein the at least one sensor is configured to communicate the measurement data to the first wireless data communication device and to transmit the measurement data via a cellular network.

11. The aerodrome signalling unit of claim 10, further comprising a second communication device coupled to the connection terminal, wherein the second communication device is configured for data communication via the power supply line.

12. The aerodrome signalling unit of claim 11, wherein the second communication device is connected to the power supply line at a connection node upstream of the electric transformer, wherein the first communication device and the second communication device are configured to exchange data signals between each other.

13. The aerodrome signalling unit of claim 10, further comprising a radio antenna for cellular communication, the radio antenna operably coupled to the first communication device.

14. The aerodrome signalling unit of the claim 13, wherein the radio antenna is arranged outside the enclosure.

15. The aerodrome signalling unit of claim 13, wherein the radio antenna is arranged inside the enclosure, wherein the enclosure comprises a material substantially transparent to radio waves.

16. The aerodrome signalling system of claim 1, further comprising a data storage system, wherein the first wireless data communication device is configured for wireless transmission of the measurement data to the data storage system via the cellular network, wherein the central communication unit comprises a second wireless data communication device, wherein the central communication unit is configured to receive first data from one or more of: the plurality of signalling units and the control unit, wherein the central communication unit is configured to transmit at least part of the first data via the second wireless data communication device via the cellular network to the data storage system.

17. The aerodrome signalling system of claim 16, further comprising a mobile user interface, wherein the mobile user interface is configured to access one or more of: the measurement data and/or the first data stored in the data storage system via the cellular network.

18. A method of operating an aerodrome signalling system, wherein the aerodrome signalling system comprises a control unit and a plurality of signalling units each provided with at least one aerodrome signalling device and at least one sensor device capturing measurement data in relation to one or more of: an environmental condition, a meteorological condition, a presence of an object, a movement of an object and a status condition relating to the respective signalling unit other than a status condition of the respective at least one signalling device, the method comprising:
gathering measurement data from the at least one sensor, and
wirelessly transmitting the gathered measurement data to a remote data storage system via a cellular network.

19. The method of claim 18, further comprising gathering operational status data from the at least one signalling device and wirelessly transmitting the gathered operational status data to the remote data storage system via the cellular network.

20. The method of claim 18, further comprising sending operating commands to the signalling units for operating the at least one signalling device, wherein the operating commands are sent selectively via a power supply line communication channel and via wireless transmission through the cellular network.

* * * * *